United States Patent
Engle et al.

(10) Patent No.: US 8,209,211 B2
(45) Date of Patent: Jun. 26, 2012

(54) APPARATUS AND METHODS FOR REQUIREMENTS DECOMPOSITION AND MANAGEMENT

(75) Inventors: James Blaine Engle, Green Valley, AZ (US); John Donald Lauer, Tucson, AZ (US); Eric Galen Davis, Tucson, AZ (US); Ashaki Ayanna Ricketts, Tucson, AZ (US); Nedzad Taljanovic, Tucson, AZ (US); Evan Thomas Webster, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 12/050,819

(22) Filed: Mar. 18, 2008

(65) Prior Publication Data

US 2009/0240723 A1 Sep. 24, 2009

(51) Int. Cl.
*G06Q 10/00* (2012.01)
*G06Q 40/00* (2012.01)
*G06Q 30/00* (2012.01)

(52) U.S. Cl. ........... 705/7.23; 705/7.11; 705/7.12; 705/7.13; 705/7.14; 705/7.15; 705/7.16; 705/7.17; 705/7.18; 705/7.19; 705/7.21; 705/7.22; 705/7.24; 705/7.25; 705/7.26; 705/7.27; 705/7.28; 705/7.29; 705/7.31; 705/7.32; 705/7.33; 705/7.34; 705/7.35; 705/7.36; 705/7.37; 705/7.38; 705/7.39; 705/7.41; 705/7.42

(58) Field of Classification Search ......... 705/7.11–7.42
See application file for complete search history.

(56) References Cited

U.S. PATENT DOCUMENTS

| 6,487,469 | B1* | 11/2002 | Formenti ........... 700/97 |
| 7,152,224 | B1 | 12/2006 | Kaler et al. |
| 7,409,656 | B1* | 8/2008 | Ruehl ............ 716/112 |
| 7,444,603 | B1* | 10/2008 | Kelly et al. ......... 716/106 |
| 2004/0168153 | A1 | 8/2004 | Marvin |
| 2004/0181471 | A1 | 9/2004 | Rogers |
| 2005/0114829 | A1 | 5/2005 | Robin et al. |
| 2005/0132320 | A1* | 6/2005 | Allen et al. ......... 716/18 |
| 2005/0166178 | A1 | 7/2005 | Masticola et al. |
| 2006/0111953 | A1* | 5/2006 | Setya ................ 705/8 |
| 2006/0168557 | A1 | 7/2006 | Agrawal et al. |
| 2006/0190922 | A1 | 8/2006 | Chen |
| 2006/0265710 | A1 | 11/2006 | Ansari |
| 2007/0288290 | A1* | 12/2007 | Motoyama et al. ...... 705/9 |

OTHER PUBLICATIONS

Orsila, H. et al.; ("Optimal subset mapping and convergence evaluation of mapping algorithms for distributing task graphs on multi-processor SoC", 2007 International Symposium on System-on-Chip; Nov. 19-21, 2007, p. 47-8).*

* cited by examiner

*Primary Examiner* — Jason Dunham
*Assistant Examiner* — Amber Altschul
(74) *Attorney, Agent, or Firm* — Kunzler Needham Massey & Thorpe

(57) ABSTRACT

An apparatus and methods are disclosed for requirements decomposition and management. The apparatus includes a collection module, an organization module, and a graph module. These modules carry out the steps of collecting a project task description, the project task description comprising one or more properties, generating a directed acyclic hierarchy of one or more project tasks associated with the project task description, and generating a directed acyclic hierarchical graph view of the project, wherein the directed acyclic hierarchical graph view of the project comprises one or more nodes representing the one or more project tasks, and wherein the one or more nodes are arranged to graphically illustrate a directed acyclic hierarchical relationship between the one or more project tasks.

21 Claims, 6 Drawing Sheets

APPARATUS AND METHODS FOR REQUIREMENTS DECOMPOSITION AND MANAGEMENT

BACKGROUND OF THE INVENTION

1. Field of the Invention

This invention relates to project management applications and more particularly relates to requirements decomposition and management.

2. Description of the Related Art

Large software development and other product development efforts typically have a set of high level requirements that the final product is expected to meet. Generally, the product is designed in a way that certain components or features specifically satisfy such requirements. If the requirements change, the requirements and design for the components and features must also change. Unfortunately, current project management systems typically require manually updating the requirements for all components and features individually when the top level requirements change.

Typically, a large portion of a project manager's time is spent tracking requirements changes, updating component requirements, updating schedules, and updating project budgets in response to high level requirement changes. Such tasks are typically tedious and error prone.

Priority tracking is also a common issue in project management. For example, completion of certain tasks may depend on the completion of certain other tasks. Consequently, the tasks that need to be completed before other tasks can be completed are typically higher priority, because the project's schedule is dependent upon the completion of those tasks. In such an environment, a change to a priority level of one task may affect the priority level of another task, and such priority changes typically require tracking.

Additionally, in engineering environments where complex systems are developed, a test engineer may work for a different department than the project manager. Consequently, a product test engineer may not have the most updated set of requirements for the product or its components and features. Therefore, the test engineer's test plan may not adequately test all of the required components and features, or the product may fail the test because some of the components or features have been deleted from the product requirements without the knowledge of the test engineer.

SUMMARY OF THE INVENTION

The present invention has been developed in response to the present state of the art, and in particular, in response to the problems and needs in the art that have not yet been fully solved by currently available project management systems. Accordingly, the present invention has been developed to provide an apparatus and methods for requirements decomposition and management that overcome many or all of the above-discussed shortcomings in the art.

The apparatus for requirements decomposition and management is provided with a plurality of modules configured to functionally execute the necessary steps of collecting a project task description, the project task description comprising one or more properties, generating a directed acyclic hierarchy of one or more project tasks associated with the project task description, and generating a directed acyclic hierarchical graph view of the project, wherein the directed acyclic hierarchical graph view of the project comprises one or more nodes representing the one or more project tasks, and wherein the one or more nodes are arranged to graphically illustrate a directed acyclic hierarchical relationship between the one or more project tasks and one or more sub-tasks associated with the one or more project tasks. These modules in the described embodiments include a collection module, an organization module, and a graph module.

In one embodiment, the collection module includes an update module configured to update the one or more properties in response to a change in the project task description. The apparatus may also include a notification module configured to automatically notify a task manager associated with the project task in response to an update to the one or more properties associated with the project task.

In a further embodiment, the organization module also includes a priority module configured to track a priority property associated with a project task, and to modify the priority property according to a predetermined constraint defined by the directed acyclic hierarchy of the one or more project tasks. The organization module may also include a status module configured to determine a status of a project task according to an aggregation of a status property collected for one or more child tasks associated with the project task.

In a further embodiment, the apparatus may include a report module configured to generate a status report according to the status associated with the project task. The apparatus may also include a test module configured to automatically generate a product test plan for a product developed according to the project task description, the product test plan generated according to a depth first progression through the directed acyclic hierarchy of the one or more project tasks associated with the project description.

A method of the present invention is also presented for requirements decomposition and management. The method in the disclosed embodiments substantially includes the steps necessary to carry out the functions presented above with respect to the operation of the described apparatus. In one embodiment, the method includes collecting a project task description, the project task description comprising one or more properties, generating a directed acyclic hierarchy of one or more project tasks associated with the project task description, and generating a directed acyclic hierarchical graph view of the project, wherein the directed acyclic hierarchical graph view of the project comprises one or more nodes representing the one or more project tasks, and wherein the one or more nodes are arranged to graphically illustrate a directed acyclic hierarchical relationship between the one or more project tasks and one or more sub-tasks associated with the one or more project tasks.

A computer program product comprising a computer readable medium having computer usable program code executable to perform operations is also presented for requirements decomposition and management. The operations of the computer program product may include operations substantially as described above with reference to the described method and apparatus.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
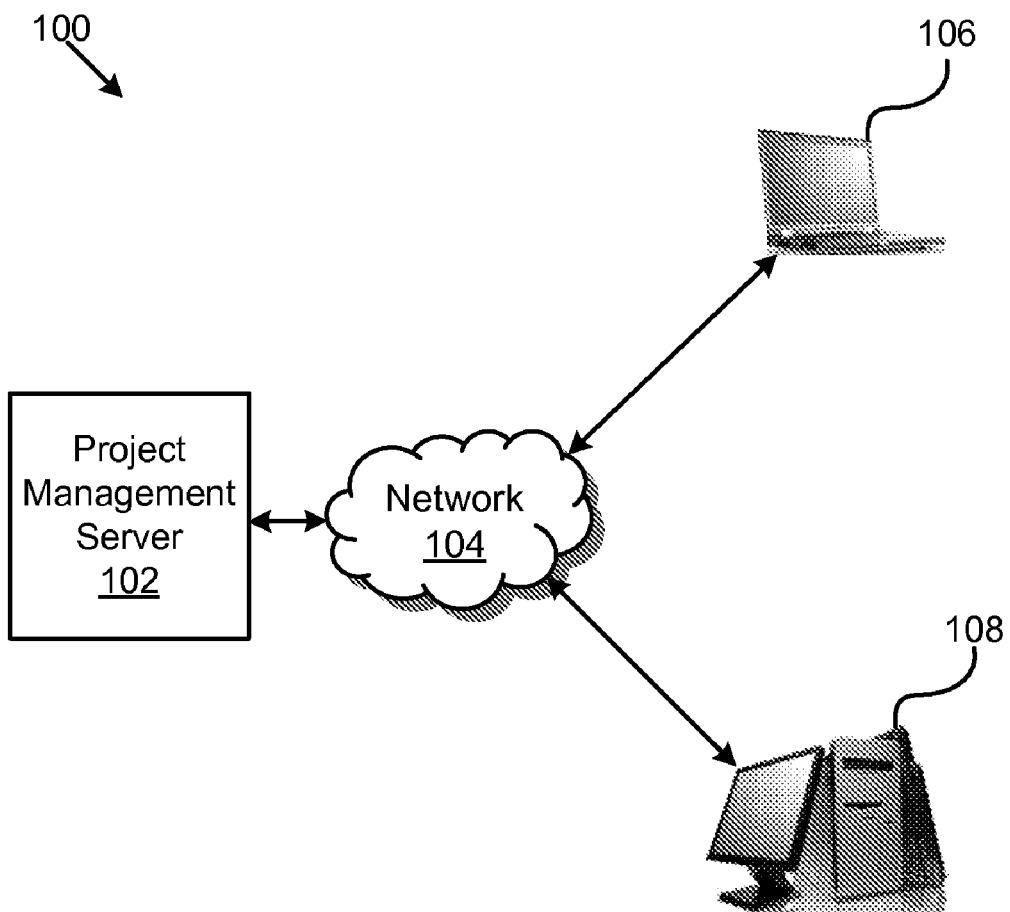
FIG. 1 is a schematic block diagram illustrating one embodiment of a system for requirements decomposition and management.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for requirements decomposition and management. The system 100 may include a project management server 102, a network 104 and one or more user terminals 106, 108. In one embodiment, the system 100 may include a portable user terminal 106 such as a laptop computer, a Personal Digital Assistant (PDA), or the like. The system 100 may also include a desktop workstation 108. In such an embodiment, a project manager or product designer may access project task data managed by the project management server 102 over the network.

For example, a project manager may enter project requirements via a project management application interface. The project management application may be accessible through a web browser interface, or through a distributed application interface. Alternatively, the project manager may access the project management application directly through a Graphical User Interface (GUI) accessible through a display connected to the project management server 102.

The project management server 102 may also communicate project task updates and notifications to product designers through the network 104. For example, the project management server 102 may send an update email to a product designer. Alternatively, a product designer may access a mobile interface to the project management server on a PDA 106 to receive project updates.

Figure 2:
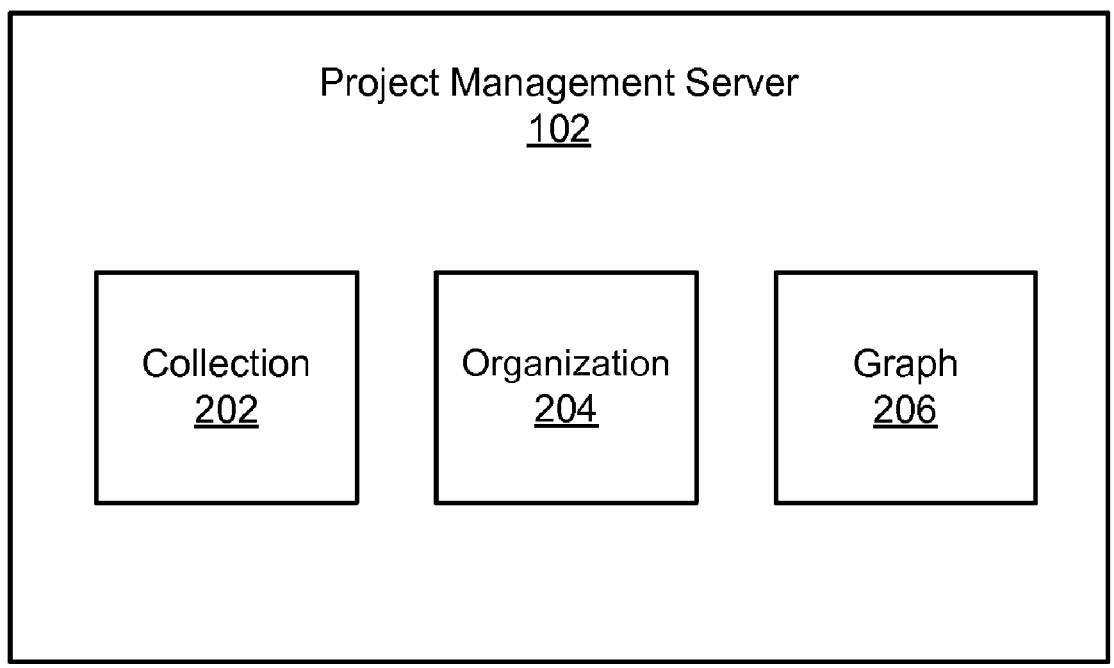
FIG. 2 is a schematic block diagram illustrating one embodiment of an apparatus for requirements decomposition and management.

FIG. 2 illustrates one embodiment of a project management server 102. Although the apparatus for requirements decomposition and management is described in the present description as the project management server 102, one of ordinary skill in the art should recognize that alternative embodiments may include standalone or distributed project management applications configured to run on desktop workstations 108 or portable workstations 106, and the like. In the depicted embodiment, the project management server 102 includes a collection module 202, an organization module 204, and a graph module 206.

The collection module 202 may collect a project task description. The project task description may include one or more properties. For example, the collection module 202 may collect a project task description for a software development project. The collection module 202 may collect a series of high level requirements for the resulting software application, such as required functions and other design considerations. The project task description may also include scheduling information, budget information, and a breakdown of tasks required to accomplish the task. The project tasks may include properties such as a priority level, a target completion date, a budget amount, a task manager assignment, and dependencies on other project tasks. In such an example, a project task may include one or more sub-tasks, each with its own set of properties.

The organization module 204 may generate a directed acyclic hierarchy of the project tasks. As used herein, the term "directed acyclic hierarchy" is related to the term "directed acyclic graph" which is a term of art in computer engineering and mathematics. A "directed acyclic hierarchy" refers to a relationship between project tasks, wherein the workflow follows a directed path which may be represented in a directed acyclic graph by arrowed lines indicating an order of project task completion, and the path does not cross back on itself, therefore it is acyclic in nature. Alternatively, work may be performed on many tasks and sub-tasks simultaneously. The hierarchy is derived from the layer/sublayer relationship between the project tasks and the project requirements. In such an embodiment, the directed path displays the relationship between a parent node and supporting child nodes.

The graph module 206 may generate a directed acyclic graph view of the hierarchy generated by the organization module 204. The graph view may include one or more nodes, each node representing a project task. The graph view may additionally include one or more arrows between nodes that indicate the direction of workflow. In one embodiment, the graph module 206 may generate the graph view in a web browser using HTML, JAVA, or the like. The graph view may provide a project manager with an understandable overview of the project and a breakdown of its requirements.

Figure 3:
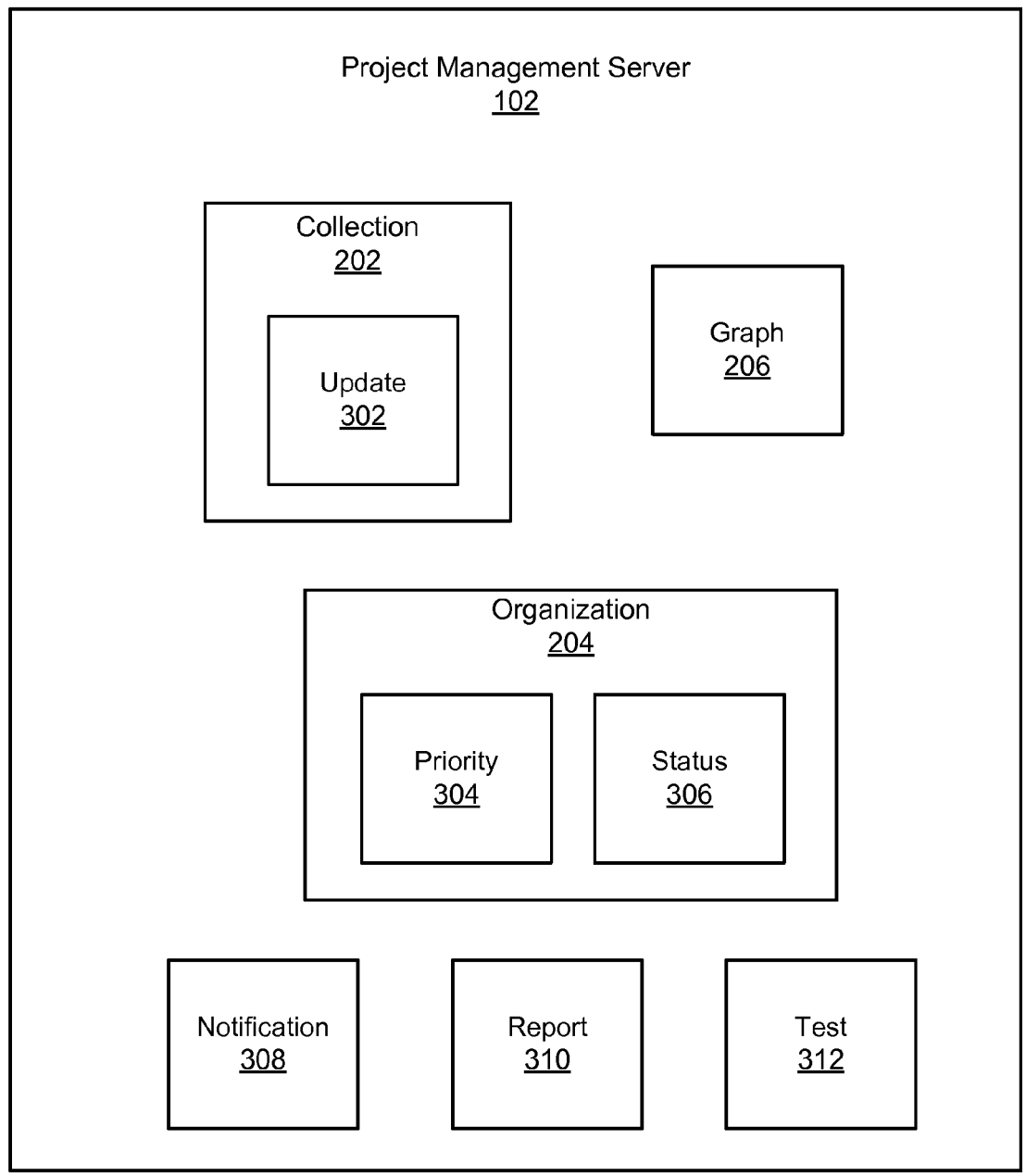
FIG. 3 is a detailed schematic block diagram illustrating another embodiment of an apparatus for requirements decomposition and management.

FIG. 3 illustrates a further embodiment of a project management server 102. In this embodiment, the project management server 102 includes the collection module 202, the organization module 204 and the graph module 206 as described above with relation to FIG. 2. Additionally, the project management server 102 may include a notification module 308, a report module 310, and a test module 312. In a further embodiment, the collection module 202 may include an update module 302. The organization module 204 may also include a priority module 304 and a status module 306.

In one embodiment, the update module 302 may update the properties of the project tasks in response to a change in the task description or in response to a change in the properties of an associated project task. For example, if the requirements of the project change, the update module 302 may update properties such as a deadline, a budget allowance, a priority, or the like. Generally, the update module 302 may track changes in the properties and the requirements of the various project tasks, and assure that the changes are reflected in the properties and requirements of associated project tasks. Beneficially, the update module 302 may help a project team avoid duplicative work, project delays, or budget overruns.

For example, the update module 302 may automatically step through each node in a directed acyclic hierarchy and update the properties, such as the deadline, in response to a schedule change. One of ordinary skill in the art will recognize various directed acyclic algorithms that may be implemented to automatically step through the project tasks. One example may include a "depth first" algorithm. In a further embodiment, the update module 302 may even delete or add certain project tasks in response to the change in the project description.

In one embodiment, the priority module 304 may specifically track the priority property associated with each project task. In a further embodiment, the priority module 304 may modify the priority property of each project task according to a predetermined constraint defined by the directed acyclic hierarchy of the project tasks. For example, if the priority level of a parent node is increased, the priority module 304 may update the priority level of the child nodes associated with the parent node, so that each child node has a priority level that at least matches that of the parent node. In such an embodiment, project delays may be avoided by ensuring that each child node is accomplished at least by the deadline set for the parent node. In a further embodiment, the predetermined constraint includes a priority level or a status level calculated based on a weighted combination of child node priority levels or status levels.

The status module 306 may determine the status of a project task. In one embodiment, the status module 306 may determine the status by taking an aggregate of the status property set by product designers for each child task. For example, where a project task includes three child tasks, the status module 306 may determine the status of the project task by taking an aggregate of the status set by the product designer for each of the three child tasks. In a further embodiment, the status module 306 may weight the status values of the child tasks based on a relative volume of work or expected duration for each child task.

The notification module 308 may automatically notify a task manager or product designer associated with a project task if one or more of the properties of the project task have been updated or modified in some way. The notification module 308 may additionally notify task managers when a new project task has been added, or when an existing project task has been deleted. The notification module 308 may also notify a task manager or a project manager when a project task has been completed, when a project deadline has been reached, or when a similar project milestone has passed. The notification module 308 may use email, paging, automated telephone messages, updates to an application interface, or the like for the notification.

In one embodiment, the report module 310 may automatically generate a status report. The status report may be generated according to a status property tracked by the status module 306. In a further embodiment, the notification module 308 may automatically send the status report to a predetermined project or task manager. The report module 310 may format the report, include a project summary, flag certain project tasks that require attention, or the like.

The project management server 102 may additionally include a test module 312. The test module may include an application function or macro configured to automatically generate a product test plan or checklist. The product test plan may be developed according to the task description. In one embodiment, the product test plan is a checklist, where each list item corresponds to a project task for a node on the directed hierarchy. In a further embodiment, the test plan may be automatically generated through a depth-first progression through the directed acyclic hierarchy of the project tasks associated with the project task description.

For example, the test module 312 may include an automated process configured to step to each node representing a project task in a directed acyclic graph to gather a list of required product features, functions, and components. The test module 312 may then automatically generate a test plan according to a predetermined or selected format. In such an example, the test plan may be automatically generated which would save time. Additionally the test plan it may be complete and thorough because the depth-first algorithm may recursively process each descendant node of a particular project task before going to a sibling task node.

Figure 4:
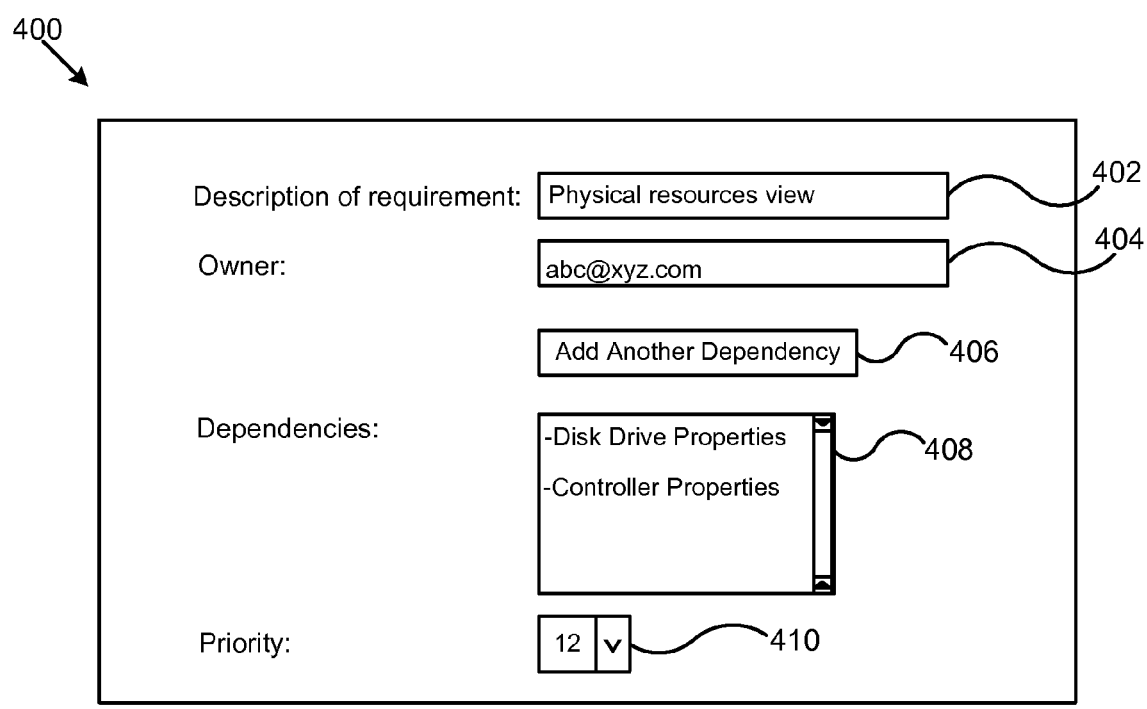
FIG. 4 is a layout view illustrating one embodiment of a user interface for collecting a project task description.

FIG. 4 illustrates one embodiment of a user interface 400 for collecting a project task description. The user interface 400 may include a requirement description field 402 for collecting a brief description or name of the project requirement. The user interface 400 may also include an owner assignment field 404 for entering an identifier, name or email address for a project task manager assigned to the requirement or project task. In a further embodiment, the user interface 400 may also include a task dependencies field 408 for identifying a set of child requirements or project sub-tasks. The user interface 400 may include a button 406 or other user control for entering additional dependencies. In another embodiment, the user interface 400 may also include a priority field 410 configured to provide a priority level selection.

The project manager may set up the project task description by entering one or more requirements in a project folder or file with the user interface. The organization module 204 may then organize the project tasks and requirements according to the assigned dependencies into a directed acyclic hierarchy. Finally, the graph module 206 may display a directed acyclic graph of the project.

Figure 5:
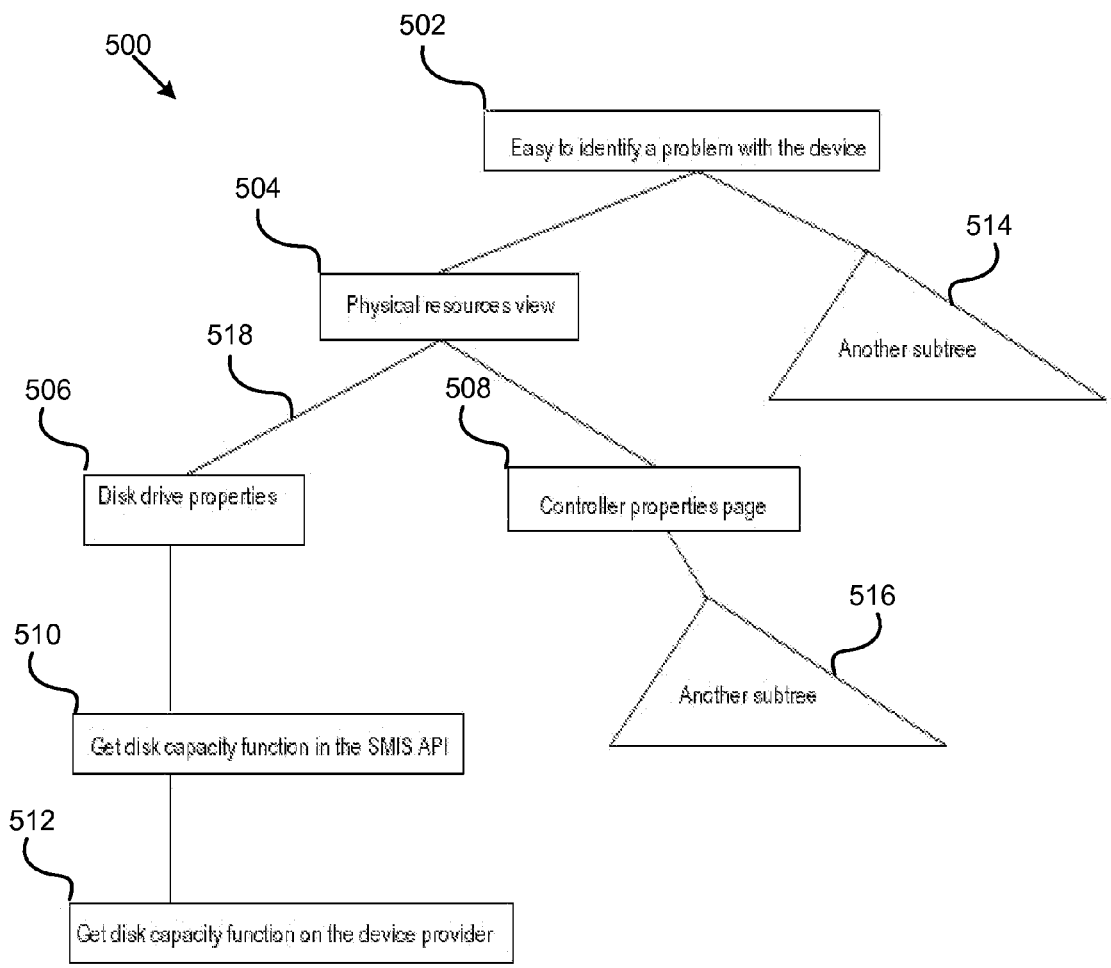
FIG. 5 is a layout view illustrating one embodiment of a directed acyclic hierarchical graph view of a project.

FIG. 5 illustrates one embodiment of a directed acyclic graph 500. The graph 500 may include a high level project description 502 that includes one or more project requirements. The graph 500 may also include one or more subtrees 514, 516 on various hierarchical levels. Each subtree 514, 516 may include additional requirements 504-508 illustrated as nodes. Each node 504-508 may be dependent upon additional child nodes 510, 512.

In such an embodiment, if the priority of the disk drive properties requirement 506 is increased from a first priority level to a second priority level, the update module 302 or the priority module 304 may update the priority property of each child node 510, 512 to a priority level that is at least equivalent to the second priority level.

In a further embodiment, when the test module 312 may systematically step down through requirements of a first subtree rooted at node 504 before moving on to requirements of a second subtree 514 to generate a test plan. For example, the test module 312 may identify requirements starting at node 504. The test module 312 may then step to node 506, then to node 510 and node 512 before moving back to node 508 and subtree 516. Once the test module 312 has gathered all of the requirements from subtree 516, the requirements from subtree 514 may be gathered, and so forth until all of the requirements for the entire project 502 have been gathered and placed in a test plan or checklist.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
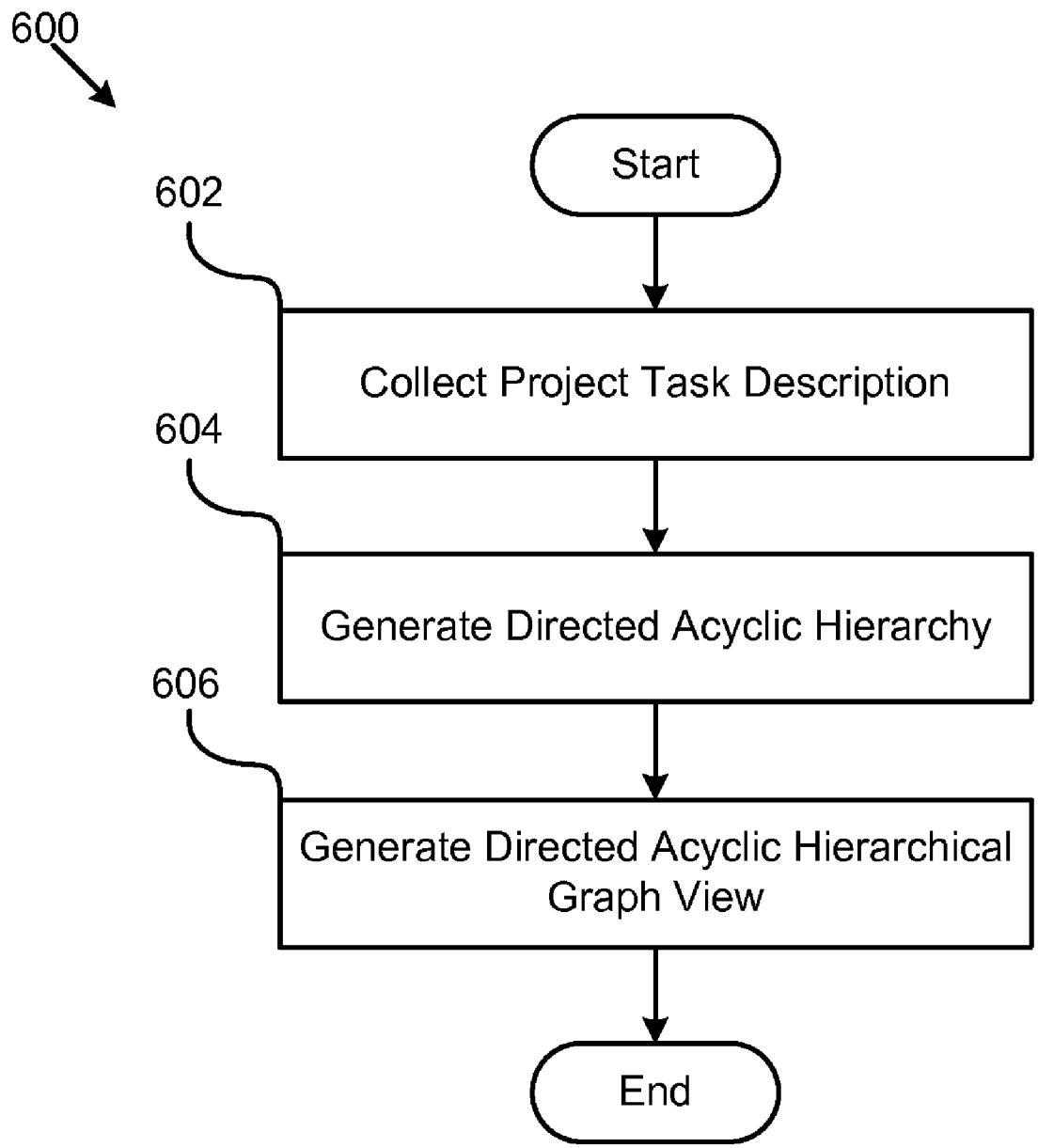
FIG. 6 is a schematic flow chart diagram illustrating one embodiment of a method for requirements decomposition and management.

FIG. 6 illustrates one embodiment of a method 600 for requirements decomposition and management. In one embodiment, the method 600 starts when the collection module 202 collects 602 the project task description. For example, the collection module 202 may display a user interface 400 for collection a description of one or more project tasks. The organization module 204 may then generate 604 a directed acyclic hierarchy of project tasks. The graph module 206 may then generate 606 a directed acyclic graph view 500 from the hierarchy generated 604 by the organization module 204. In one embodiment, the method 600 may end. In a further embodiment, the method 600 may include additional steps such as requirement change tracking and updates, priority tracking, notification, and test plan development.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for requirements decomposition and management, the apparatus comprising:
    a collection module configured to collect a project task description, the project task description comprising one or more properties;
    an organization module configured to generate, by use of a processor, a directed acyclic hierarchy of one or more project tasks associated with the project task description, wherein the directed acyclic hierarchy is acyclic in nature in that a flow through the directed acyclic hierarchy does not cross back on itself; and
    a graph module configured to generate a directed acyclic hierarchical graph view of the project, wherein the directed acyclic hierarchical graph view of the project comprises one or more nodes representing the one or more project tasks, and wherein the one or more nodes are arranged to graphically illustrate a directed acyclic hierarchical relationship between the one or more project tasks and one or more sub-tasks associated with the one or more project tasks.

2. The apparatus of claim 1, wherein the collection module further comprises an update module configured to update the one or more properties in response to a change in the project task description.

3. The apparatus of claim 2, further comprising a notification module configured to automatically notify a task manager associated with the project task in response to an update to the one or more properties associated with the project task.

4. The apparatus of claim 1, wherein the organization module further comprises a priority module configured to track a priority property associated with a project task, and to modify the priority property according to a predetermined constraint defined by the directed acyclic hierarchy of the one or more project tasks.

5. The apparatus of claim 1, wherein the organization module further comprises a status module configured to determine a status of a project task according to an aggregation of a status property collected for one or more child tasks associated with the project task.

6. The apparatus of claim 5, further comprising a report module configured to generate a status report according to the status associated with the project task.

7. The apparatus of claim 1, further comprising a test module configured to automatically generate a product test plan for a product developed according to the project task description, the product test plan generated according to a depth first progression through the directed acyclic hierarchy of the one or more project tasks associated with the project description.

8. A computer program product comprising a computer readable medium having computer usable program code executable to perform operations for requirements decomposition and management, the operations of the computer program product comprising:
  collecting a project task description, the project task description comprising one or more properties;
  generating a directed acyclic hierarchy of one or more project tasks associated with the project task description, wherein the directed acyclic hierarchy is acyclic in nature in that a flow through the directed acyclic hierarchy does not cross back on itself; and
  generating a directed acyclic hierarchical graph view of the project, wherein the directed acyclic hierarchical graph view of the project comprises one or more nodes representing the one or more project tasks, and wherein the one or more nodes are arranged to graphically illustrate a directed acyclic hierarchical relationship between the one or more project tasks and one or more sub-tasks associated with the one or more project tasks.

9. The computer program product of claim 8, further comprising updating the one or more properties in response to a change in the project task description.

10. The computer program product of claim 9, further comprising automatically notifying a task manager associated with the project task in response to an update to the one or more properties associated with the project task.

11. The computer program product of claim 8, further comprising tracking a priority property associated with a project task, and to modify the priority property according to a predetermined constraint defined by the directed acyclic hierarchy of the one or more project tasks.

12. The computer program product of claim 8, further comprising determining a status of a project task according to an aggregation of a status property collected for one or more child tasks associated with the project task.

13. The computer program product of claim 12, further comprising generating a status report according to the status associated with the project task.

14. The computer program product of claim 8, further comprising automatically generating a product test plan for a product developed according to the project task description, the product test plan generated according to a depth first progression through the directed acyclic hierarchy of the one or more project tasks associated with the project description.

15. A method for requirements decomposition and management, the method comprising:
  collecting a project task description, the project task description comprising one or more properties;
  generating, by use of a processor, a directed acyclic hierarchy of one or more project tasks associated with the project task description, wherein the directed acyclic hierarchy is acyclic in nature in that a flow through the directed acyclic hierarchy does not cross back on itself; and
  generating a directed acyclic hierarchical graph view of the project, wherein the directed acyclic hierarchical graph view of the project comprises one or more nodes representing the one or more project tasks, and wherein the one or more nodes are arranged to graphically illustrate a directed acyclic hierarchical relationship between the one or more project tasks and one or more sub-tasks associated with the one or more project tasks.

16. The method of claim 15, further comprising updating the one or more properties in response to a change in the project task description.

17. The method of claim 16, further comprising automatically notifying a task manager associated with the project task in response to an update to the one or more properties associated with the project task.

18. The method of claim 15, further comprising tracking a priority property associated with a project task, and to modify the priority property according to a predetermined constraint defined by the directed acyclic hierarchy of the one or more project tasks.

19. The method of claim 15, further comprising determining a status of a project task according to an aggregation of a status property collected for one or more child tasks associated with the project task.

20. The method of claim 19, further comprising generating a status report according to the status associated with the project task.

21. The method of claim 15, further comprising automatically generating a product test plan for a product developed according to the project task description, the product test plan generated according to a depth first progression through the directed acyclic hierarchy of the one or more project tasks associated with the project description.

* * * * *